W. A. JAMES.
COUPLING.
APPLICATION FILED JULY 18, 1917.
1,253,831.
Patented Jan. 15, 1918.
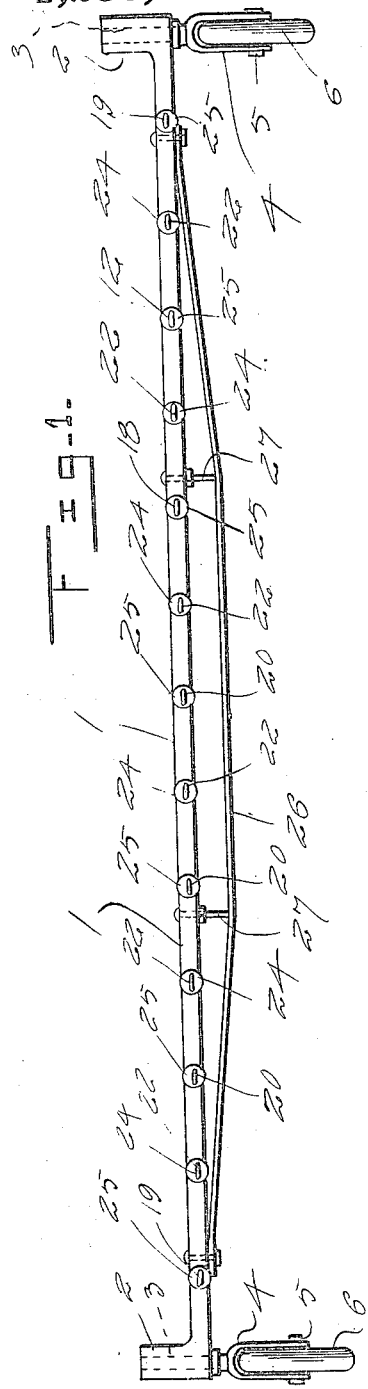
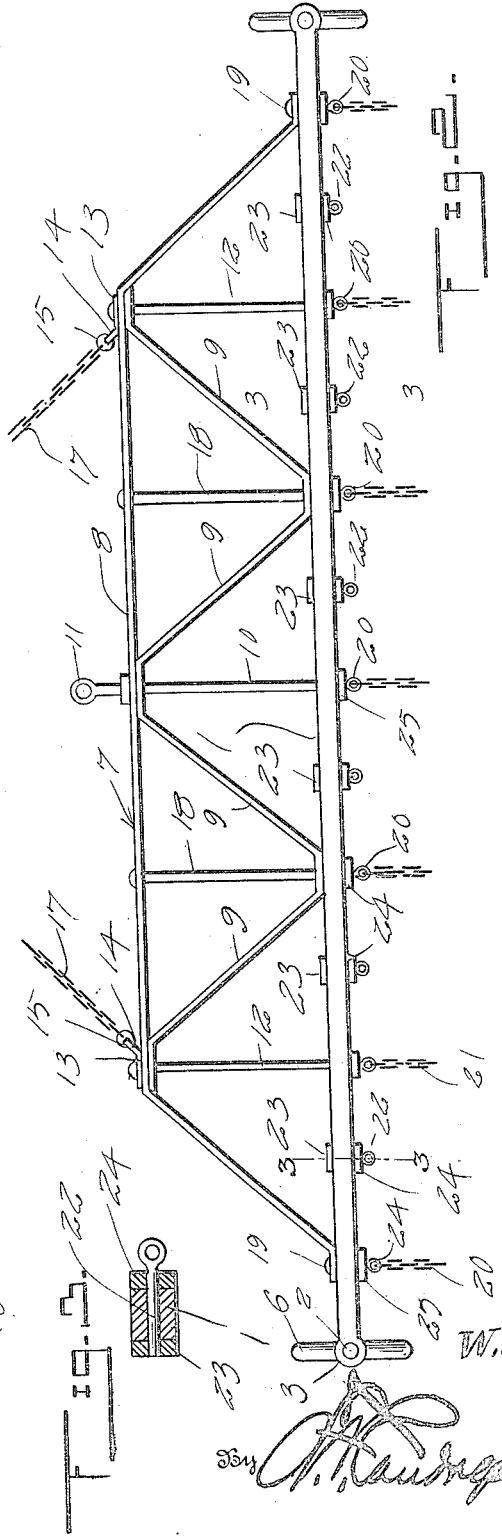

UNITED STATES PATENT OFFICE.

WILLIAM A. JAMES, OF BISHOPVILLE, SOUTH CAROLINA.

COUPLING.

1,253,831.   Specification of Letters Patent.   Patented Jan. 15, 1918.

Application filed July 18, 1917. Serial No. 181,304.

*To all whom it may concern:*

Be it known that I, WILLIAM A. JAMES, a citizen of the United States, residing at Bishopville, in the county of Lee and State of South Carolina, have invented certain new and useful Improvements in Couplings; and I do hereby declare the following to be a full, clear, and exact description of the invention, such as will enable others skilled in the art to which it appertains to make and use the same.

This invention relates to a coupling truck structure which is designed for attachment to tractors whereby the ordinary type of single or double shovel one horse cultivator may be attached to a tractor, in multiple relation, for the proper cultivation of various types of crops such as corn, cotton or the like.

An object of this invention is to provide a coupling structure as specified which is comparatively simple in construction, durable and which is designed so that a plurality of implements may be hitched to a tractor so as to eliminate the necessity of the employment of horses for pulling the cultivator or implement.

With the foregoing and other objects in view this invention consists in such novel features of construction, combination and arrangement of parts as will be hereinafter more fully described, illustrated in the accompanying drawing and claimed.

In describing the invention in detail reference will be had to the accompanying drawing wherein like characters designate like and corresponding parts throughout the several views, and in which:

Figure 1 is a rear elevation of the improved coupling truck,

Fig. 2 is a top plan view of the coupling, and

Fig. 3 is a section on the line 3—3 of Fig. 2.

Referring more particularly to the drawing, 1 indicates the main supporting bar of the coupling truck structure which has a pair of upstanding bearings 2 formed upon its end. The bearings 2 rotatably support vertical shafts 3 of forked members 4, which forked members carry axles 5 at their lower ends upon which supporting wheels 6 are mounted. The shafts 3 are rotatably mounted within the bearings 2 so as to provide a swiveled mounting for the supporting wheels 6.

A bar 7 which has its ends bent obliquely to the line of travel of the coupling is attached to the bar 1 so that the greater portion 8 of the bar will be parallel to the bar 1 and in spaced relation thereon. Suitable braces 9 are provided which are attached to the bars 7 and 1, as clearly shown in Fig. 2 of the drawing for bracing the coupling structure and also for forming a brace for the main coupling rod 10 which has an eye 11 formed upon its forward end to which the coupling of a tractor is hitched or connected. A pair of bolts 12 are provided which extend through the portion 8 of the bar 7 near its ends, through the angled ends of the braces 9 and through the bar 1. The bolts 12 also attach plates 13 to the forward outer surfaces of the portion 8 of the bar 7 at its ends. The plates 13 have their inner ends angled as shown at 14, and they have rings 15 connected thereto.

Stay chains 17 are attached to the rings 15 and are provided for attachment to the tractor which is coupled to the rod 10 and they are designed for more securely connecting the coupling member to the tractor. The bolts 12, the bracing bolts 18, and the bolts 19 which secure the ends of the bar 7 to the bar 1 are all provided with eyes 20 which extend upon the opposite side of the bar 1 from the bar 7 as clearly shown in Fig. 2 of the drawing. Chains or analogous flexible members 21 are connected to the eyes 20, and these chains or flexible members are adapted for connection with the clevises carried by the forward ends of the beams of the usual type of single shovel cultivator employed in the southern sections of the country. However, it is to be understood that the ordinary type of multiple shovel cultivator may be attached to the coupling structure if desired without departing from the spirit of this invention.

The bar 1 has a plurality of eye bolts 22 attached thereto intermediate each pair of the eyes 20 and these eye bolts are adapted for having flexible members connected thereto if it is so desired, they being provided for permitting of the proper spacing of the implements which are connected to the coupling structure. The eye bolts 22 extend through the bar 1 and have their threaded ends seated in nuts 23 which clamp against the forward edge of the bar 1 while washers 24 are clamped against the outer rear face of the bar 1 by the threading of the threaded ends of the eye bolts into the nuts 23. Suitable collars 25 are mounted upon the ends of the bolts 12, 13, 19 and 10, and engage the rear surface of the bar 1.

A suitable bracing rod 26 has its ends attached to the under surface of the bar 1 and it is held downwardly in spaced bracing position with respect to the bar 1 by suitable bolts 27.

In reducing the invention to practice, certain minor features of construction, combination and arrangement of parts may necessitate alterations to which the patentee is entitled provided such alterations are comprehended within the scope of what is claimed.

What is claimed is:—

In a device as set forth, a main supporting bar, supporting wheels swivelly carried at the ends of said bar, a second bar positioned forwardly of and held in spaced relation to the main body bar, a bolt extending through said bars and having an eye formed upon its forward end, a pair of chains connected to said second named bars, a plurality of eye bolts carried by said main body bar, and flexible members connected to the eyes of said eye bolts.

In testimony whereof I affix my signature in presence of two witnesses.

WILLIAM A. JAMES.

Witnesses:
Ed. E. Gedenson,
E. B. Woodward.

Copies of this patent may be obtained for five cents each, by addressing the "Commissioner of Patents, Washington, D. C."